US008401900B2

(12) United States Patent
Cansler et al.

(10) Patent No.: US 8,401,900 B2
(45) Date of Patent: Mar. 19, 2013

(54) SYSTEM AND METHOD FOR PRESENTING ADVERTISING DATA BASED ON END USER TRICK-PLAY TREND DATA

(75) Inventors: James L. Cansler, Cedar Park, TX (US); Charles Scott, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1096 days.

(21) Appl. No.: 12/031,361

(22) Filed: Feb. 14, 2008

(65) Prior Publication Data

US 2009/0210300 A1 Aug. 20, 2009

(51) Int. Cl.
*G06Q 30/00* (2012.01)
*G05B 19/418* (2006.01)

(52) U.S. Cl. ......................... 705/14.49; 725/14; 725/136
(58) Field of Classification Search ...................... 725/14, 725/136

See application file for complete search history.

(56) References Cited

U.S. PATENT DOCUMENTS

| | | | | |
|---|---|---|---|---|
| 2002/0184047 | A1* | 12/2002 | Plotnick et al. | 705/1 |
| 2004/0034874 | A1* | 2/2004 | Hord et al. | 725/136 |
| 2005/0097593 | A1* | 5/2005 | Raley et al. | 725/14 |
| 2006/0080167 | A1* | 4/2006 | Chen et al. | 705/14 |
| 2006/0085816 | A1* | 4/2006 | Funk et al. | 725/34 |
| 2006/0222322 | A1 | 10/2006 | Levitan | |

OTHER PUBLICATIONS

VOD server vendors tackle ad-skipping, ratings issue. Stump, Matt Multichannel News, v 23, n 22, p. 35(2). Jun. 3, 2002.*

* cited by examiner

*Primary Examiner* — John Weiss
*Assistant Examiner* — Victoria Vanderhorst
(74) *Attorney, Agent, or Firm* — G. Michael Roebuck

(57) ABSTRACT

A computer readable medium is disclosed containing a computer program including but not limited to computer executable instructions that when executed by a computer are useful in performing a method for presenting advertising data, the method including but not limited to sensing current trick-play command data at an end user device; updating trick-play trend data for the end user device based on the current trick-play command data; and adjusting a number of advertising data items in an advertising data buffer presented at the end user device based on the trick-play trend data. A system is disclosed useful for performing the method. A data structure is disclosed for containing data used by the system and method.

18 Claims, 7 Drawing Sheets

SYSTEM AND METHOD FOR PRESENTING ADVERTISING DATA BASED ON END USER TRICK-PLAY TREND DATA

FIELD OF THE DISCLOSURE

The present disclosure relates to the field of advertising during playback of digital video data.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television (TV), special or pay-per-view programming, video on demand (VOD), and other content choices available to subscribers. Television advertisers now target advertisements based on regions in which the television signal is delivered. For example, viewers in a New York state region will receive different advertising data than viewers in a Texas state region.

DETAILED DESCRIPTION

Figure 1:
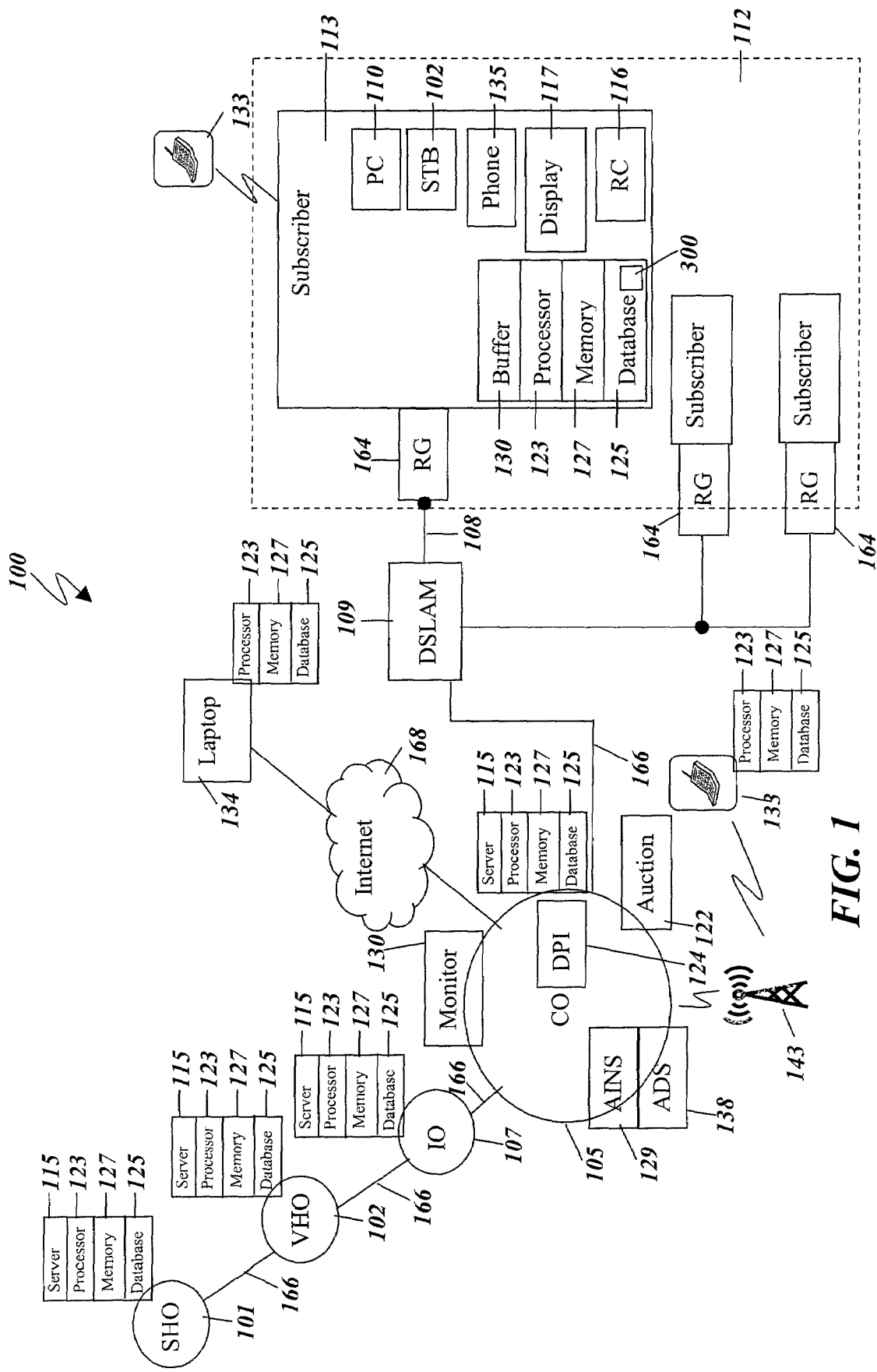
FIG. 1 depicts an illustrative embodiment of a system for presenting advertising data.

A particular illustrative embodiment discloses a digital video recorder (DVR) interface wherein video advertising characteristics presented at an end user device differ in real-time based on the user's use of trick-play command data at the end user device. The system, for example, inserts additional advertising data items in real time for end users at an end user device who fast-forward through or skip through broadcast advertising data items, and similarly displays fewer advertising data items to users who watch the broadcast data items at regular speed without fast forwarding or skipping through broadcast advertising data items.

An illustrative embodiment of a disclosed system and method thereby offers at least partial exposure, to additional advertising data items when the user is fast-forwarding through a commercial break during playback of video and embedded advertising data items at an end user device. Further, and more importantly, a particular illustrative system and method trains end users associated with end user devices that there will actually be fewer advertising data items to watch if they do not skip or fast forward through advertising data items. If the end user simply watches the broadcast and embedded advertising data items at regular speed, without trick-play commands, a particular embodiment increases the likelihood that advertising data item avoidant users will actually watch more or at least some broad cast advertising data items.

Users skipping advertising data items via DVR trick-play functions has become of critical concern to the advertising industry. A particular illustrative embodiment provides a natural incentive to watch advertising data items presented at an end user device, while dissuading end users from skipping advertising data items. The disclosed system and method thereby offers at least partial exposure to additional advertising data items when the user is fast-forwarding through a commercial break.

A number of approaches are provided to gather the advertising data item inventory for the real-time insertions during trick-play command execution. The advertising data items can be pulled from broadcast transmissions, delivered separately over broadband or a satellite sub-channel, via multicast or unicast from an internet protocol television (IPTV) system, etc. A system then analyzes trick-play behavior over commercial breaks presenting advertising data items at an end user device and dynamically adjusts the displayed advertising data items in real-time.

Prioritizations and end user profile data supplied by the service provider or network, or logic on the STB or its backend system, determines which advertising data items are presented as audio advertisements or presented for display and which advertising data items are not presented during real-time playback at an end user device. Another embodiment further determines which additional advertising data items are inserted during fast-forward advertising data item insertions. Another embodiment selects presented advertising data items for presentation based on an end user profile driven by demography and personalization. Thus if to pare six advertising data items from six down to two, an illustrative embodiment selects two of the six advertising data items that are best matched to user preferences and interests. In another embodiment, advertising data item types that have been skipped in the past by an end user, as indicated by trick-play trend data, current trick-play command data and trick-play historical command data.

A particular illustrative embodiment provides a system and method that benefits the user by introducing a more palatable form of mandatory advertising data item watching; if my DVR is going to make me watch advertising data items, it may as well be two instead of six; while still allowing the user to use trick-play to compress the amount of time it takes to skip an advertising data item break, if desired. An illustrative embodiment benefits the service provider, networks and advertising industries by providing additional partial advertising data insertions during a fast-forward operation; and by attaching a user benefit to slowing down and actually watching advertising data items.

In another particular embodiment, a computer readable medium is disclosed, the medium containing a computer program comprising computer executable instructions that when executed by a computer are useful in performing a method for presenting advertising data, the method including but not limited to sensing current trick-play command data at an end user device, updating trick-play trend data for the end user device based on the current trick-play command data and adjusting a number of advertising data items in an advertising data buffer presented at the end user device based on the trick-play trend data. In another embodiment of the medium, the method further includes but is not limited to substituting in the advertising data buffer an advertising data item having a watched advertising data item type for an advertising data item having a skipped advertising data item type.

In another embodiment of the medium, in the method adjusting further includes but is not limited to placing additional advertising data items in the advertising data buffer when the trick-play trend data indicates that most recent prior trick-play command data skipped an advertising data item in the advertising data buffer and removing advertising data items from the advertising data buffer when the trick-play trend data indicates that the most recent prior trick-play command data did not skip an advertising data item in the advertising data buffer. In another embodiment of the medium, in the method placing further includes but is not limited to placing an additional number of advertising data items in the advertising data buffer in proportion to an amount of data skipped in the advertising data buffer by the current trick-play command data.

In another embodiment of the medium, in the method placing further includes but is not limited to extending trick-play execution duration for the current trick-play command data based on the trick-play trend data and presenting at the end user device, the advertising data items in the advertising data buffer for the extended trick-play execution duration. In another embodiment of the medium, the method further includes but is not limited to receiving a trick-play advertising data queue at the end user device from an IPTV system identifying the advertising data items presented. In another embodiment of the medium, the method further includes but is not limited to receiving from an IPTV system at the end user device a unicast of the additional advertising data items based on an end user profile for an end user associated with the end user device.

In another particular embodiment, a system for presenting advertising data is disclosed, the system including but not limited to a processor in data communication with advertising data items at an end user device; an advertising data buffer for containing the advertising data items at the end user device and a computer program including but not limited to instructions embedded in a computer readable memory, the computer program further including but not limited to instructions to sense current trick-play command data at an end user device, instructions to update trick-play trend data for the end user device based on the current trick-play command data and instructions to adjust a number of advertising data items in an advertising data buffer presented at the end user device based on the trick-play trend data.

In another embodiment of the system, the computer program further includes but is not limited to instructions to substitute in the advertising data buffer an advertising data item having a watched advertising data item type for an advertising data item having a skipped advertising data item type. In another embodiment of the system, the instructions to adjust further comprise instructions to place additional advertising data items in the advertising data buffer when the trick-play trend data indicates that a most recent prior trick-play command data skipped an advertising data item in the advertising data buffer and instructions to remove advertising data items from the advertising data buffer when the trick-play trend data indicates that the most recent prior trick-play command data did not skip an advertising data item in the advertising data buffer.

In another embodiment of the system, the instructions to place further include but are not limited to instructions to place an additional number of advertising data items in the advertising data buffer in proportion to an amount of data skipped in the advertising data buffer by the current trick-play command data. In another embodiment of the system, the instructions to extend trick-play execution duration for the current trick-play command data based on the trick-play trend data and instructions to present at the end user device, the advertising data items in the advertising data buffer for the extended trick-play execution duration.

In another embodiment of the system, the computer program further includes but is not limited to instructions to receive a trick-play advertising data queue at the end user device from an IPTV system identifying the advertising data items presented. In another embodiment of the system, the instructions to place further comprise instructions to receive from an IPTV system at the end user device a unicast of the additional advertising data items based on an end user profile for an end user associated with the end user device.

In another embodiment, a data structure is disclosed embedded a computer readable medium, the data structure including but not limited to a first field for containing data indicative of trick-play trend data based on most recent prior trick-play command data. In another embodiment of the data structure, the data structure includes but not limited to a second field for containing data indicative of a watched advertising data item type for replacing a skipped advertising data item type in an advertising data buffer based on the trick-play trend data. In another embodiment of the data structure, the data structure includes but not limited to a third field for containing data indicative of an advertising insertion ratio for placing an additional number of advertising data items in the advertising data buffer. In another embodiment of the data structure, the data structure includes but not limited to a fourth field for containing data indicative of an extended trick-play advertising duration for presenting the advertising data items in the advertising data buffer for the extended trick-play advertising duration.

Turning now to FIG. 1, FIG. 1 depicts an illustrative embodiment of a system for automatically selecting and present advertising data for a subscriber based on trick-play command data and other data stored at end user devices in an IPTV system. The IPTV system provides IPTV video data, VoIP data and Internet data services to end user devices. The video data can be video data including but not limited to television programming, movies, and video on demand in which Meta data describing the video data may be supplied; or video data without associated Meta data for subscriber created videos such as video data provided on popular Internet sites such as My Space™ and You Tube™. Meta data for advertising data items, movies and television programs include title and description for the video. In an illustrative embodiment, advertising data characterization and video characterization data are generated at the end user device or upstream in the IPTV system by processing the advertising data and video data using image recognition, speech to text recognition, character recognition and Meta data for the video to characterize the advertising data and video data stream that is being watched, skipped or is scheduled to be watched at an end user device.

In an illustrative embodiment, the IPTV system builds subscriber or end user profile data for IPTV end user devices by aggregating and correlating subscriber related statistics and subscriber activity data along with other subscriber data and demographic information such as gender, age, income, languages spoken, areas of interest, etc. for IPTV subscribers or other end users associated with the end user devices. Some of the subscriber profile data can be volunteered by an IPTV subscriber during an IPTV registration process. In another particular embodiment, the subscriber profile data further contains data for which a subscriber has opted in for monitoring and use by an IPTV system for the purposes of automatically receiving targeted advertising data. Subscriber preferences for particular advertising classes of current viewers can be estimated from data included in the subscriber profile, including but not limited to device type, subscriber type, and device state based on the subscriber activity data.

Based on subscribers' interests, background, and subscriber profiling results, purchases, visited locations, demographics and subscriber activity data, advertising data selection and presentation methods and systems described herein or an equivalent thereof can be utilized to estimate an auction price and select targeted advertising for content stored at an end user device. Targeted advertising data is automatically selected and made available to personalize advertising data and television commercial delivery to IPTV television displays, portable subscriber data and messaging devices such as mobile or cell phones and video, website banners and pop up displays on a PC or mobile Laptop computer. Advertising data is also automatically selected and made available to personalize advertising data and television commercial delivery to IPTV television displays, portable subscriber data and messaging devices such as mobile or cell phones and video, website banners and pop up displays on a PC or mobile Laptop computer.

As shown in FIG. 1, in an illustrative embodiment an IPTV system 100 delivers video content data and advertising data to subscriber house holds 113 and associated end user devices (also referred to herein as subscriber devices) which may be inside or outside of the household. Television advertising data is inserted or marked as available by the advertising server 138. In the IPTV system, IPTV video data are broadcast in an internet protocol (IP) format from a server at a super hub office (SHO) 101 to a regional or local IPTV video hub office (VHO) server 103, to a central office (CO) server 105 and intermediate office (IO) 107. The IPTV system 100 includes a hierarchically arranged network of servers and processors wherein the SHO transmits video and advertising data to a video hub office (VHO) 103 and the VHO transmits to an IPTV server location close to a subscriber, such as a CO server 105 or IO 107. In another particular embodiment, each of the SHO, VHO, CO, and IO is interconnected with an IPTV transport 166. In a particular embodiment, the IPTV transport 166 consists of but is not limited to high speed fiber optic cables interconnected with routers for transmission of internet protocol data. The IPTV servers also provide data communication for data and video associated with Internet and VoIP services to subscribers. End users access the Internet 168 and cell phone system 143 via the IPTV system.

Actively viewed IPTV channels are sent via unicast or multicast IP data streams to end user devices in an IP data multicast or unicast group to access nodes such as digital subscriber line access multiplexers (DSLAMS) 109. A mapping of unicast and multicast address advertising data channels for each end user device is stored in a data base at the CO. Broadcast video data including embedded advertising data or an advertising data queue is delivered to end user devices using a multicast or unicast data stream which is personalized for each end user device based on trick-play trend data and end user profile data. A multicast or unicast for a particular IPTV channel is joined over a DSL line 108 from the DSLAM by an end user device, such as the set-top boxes (STBs) at IPTV subscriber homes. Each STB includes processor 123, a memory 127, and a database 125. Each SHO, VHO, CO and IO includes a server 115, processor 123, a memory 127, and a database 125. The processor 123 further includes a network interface. The processor reads computer programs containing executable instructions from a computer readable medium such as memory 127. The network interface functions to send and receive data over the IPTV transport 166 and DSL line 108. The CO server delivers IPTV, Internet and VoIP video content and advertising data to the subscriber end user devices via the DSLAM. The television, internet and VoIP data and content is delivered via multicast and unicast television advertising depending on a single subscriber or a targeted television advertising group of end user client subscriber devices to which the advertising data is directed.

In another particular embodiment, subscriber devices, including but not limited to, wire line phones 135, portable phones 133, mobile computer 134 personal computers (PC) 110 and STB 102 communicate with a communication system, e.g., IPTV system through residential gateway (RG) 164 and high speed communication lines 108 and 166. In another particular embodiment, deep packet inspection (DPI) device 124 inspects VoIP, Internet and IPTV video data, computer data, commands and Meta data transmitted between the subscriber devices (subscriber activity data) and the IPTV system servers. In another illustrative embodiment subscriber activity data are monitored and collected whether or not the subscriber's devices are in the household 113 or traveling as mobile devices outside of the household. When outside of the household, subscriber mobile device activity data and transactions data are monitored by a communication network (e.g., IPTV system) servers or nodes which associate the subscriber activity data with particular subscriber's end user devices. In another particular embodiment, subscriber activity data such as communication and purchase transactions are inspected by DPI devices located in a communication system, e.g., IPTV system servers. These communication system servers route the subscriber activity data to an IPTV server such as the CO in which the subscriber activity data for a subscriber are stored for processing. While an IPTV system has been used as an example in the illustrative embodiment, the disclosure is not meant to be limited to IPTV as other communication systems such as cable television or other digital and analog data delivery systems can be used in other embodiments.

In another particular embodiment, the end user subscriber devices further include but are not limited to a client user computer, a personal computer (PC), a tablet PC, a set-top box (STB), a Personal Digital Assistant (PDA), a cellular telephone, a mobile device, a palm computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP, video data, advertising data, Internet video and data and IPTV video and data, commands and Meta data between the subscriber end user devices and the IPTV system servers and the Internet.

In another illustrative subscriber activity data are monitored and collected whether or not the subscriber devices are in the household 113 or the devices are mobile devices connected via cellular network or WiFi outside of the household. When outside of the household, subscriber mobile device data are monitored by communication system servers (e.g., IPTV system) which associate the subscriber activity data with each particular subscriber's end user device. In another particular embodiment, subscriber activity data such as IPTV and Internet video selections, and communication and purchase transactions are inspected by DPI devices located in a communication system, e.g., IPTV system servers. These communication system servers route the subscriber activity data to a CO in which the subscriber activity data for a subscriber are stored for processing and become part of the historical behavior profile for the end user. The DPI devices assist in advertising data characterization for determining skipped and watched advertising data item types. The advertising data characterization is correlated with trick-play command data and stored in the trick-play trend data and trick-play history data.

As shown in FIG. 1 advertising sub groups 112 (comprising a group of subscriber house holds 113) receive multicast and unicast video and advertising data at STB 102 in a video or advertising data stream from CO server 107 and DSLAM 109. Individual households 113 receive advertising data at STB 102 or one of the other subscriber devices. More than one STB 102 can be located in an individual household 113 and each individual STB can receive a separate multicast or unicast advertising stream on IPTV transport 166. In another particular illustrative embodiment, separate and unique advertising data are sent to each set top box (STB) 102 tailored to target the particular subscriber watching television at that particular STB and accommodate insertion of adverting data during trick-play command data execution. Each STB 102 has an associated remote control (RC) 116 and video display 117 which provides for presentation of video data, advertising data and audio data contained in the video data. The subscriber selects channels for a video data viewing selection (video programs, games, movies, video on demand) via the RC and places orders for products and services over the IPTV system 100.

FIG. 1 depicts an illustrative communication system, including but not limited to a television advertising insertion system wherein television advertising data can be inserted at an IPTV server (SHO, VHO, CO, IO) for delivery to an end user device, for example, an STB, mobile phone, web browser or personal computer. Advertising data can be inserted into or made available during replay of IPTV or other video data stored at an end user device. The advertising data is delivered via advertising insertion device 129 located at the IPTV CO server or at one of the end user devices such as the STB 102 or other end user device which inserts the advertising data into video data. The IPTV servers include an advertising server (AINS) 129 and an advertising database (ADS) 138. The advertising data is selected by advertising selection element 129 from the advertising database 138 based on an auction for an available advertising spot based on a subscriber profile and delivered by the VHO advertising server 138. An SHO 101 distributes data to a regional VHO 103 which distributes data to local COs 105 which distributes data to a digital subscriber access line access multiplexer (DSLAM) access node to subscriber devices such as STB 102, PC 110, wire line phone 135, mobile phone 133, etc. Advertising data is also selected based on the subscriber profile and sent to a mobile phone or computer associated with the subscriber. The subscriber profile is built based on a subscriber's IPTV, Internet and VoIP activity. The targeted advertisements and other advertising data that are embedded in the incoming video data stream to an end user device are harvested at the end user device. Advertising data is stored in advertising data buffer 130. Advertising data queues and other data are stored in data structures 300 as described below in association with FIGS. 5 and 6.

Figure 2:
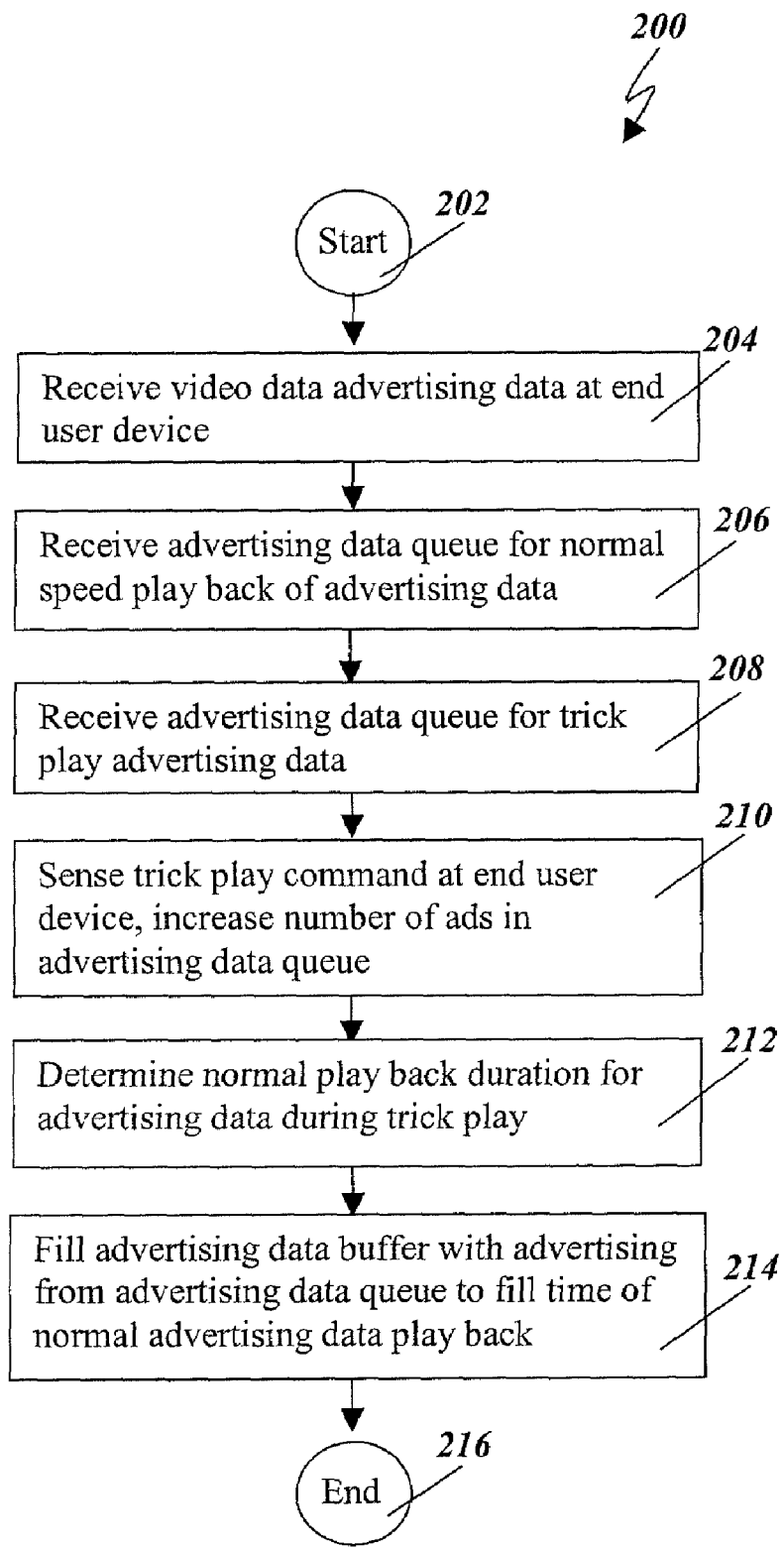
FIG. 2 depicts a flow chart of functions performed in an illustrative method for presenting advertising data.

Turning now to FIG. 2, in an illustrative embodiment a flowchart of functions 200 are executed as shown in FIG. 2. In other embodiments, the order the functions execution can be in any order and is not dictated by FIG. 2. In a particular illustrative embodiment, a particular function may be left out or executed in any order and a particular embodiment. As shown in FIG. 2 flowchart 200 begins at terminal 202 and proceeds to block 204 when in an illustrated embodiment receives advertising data at an end user device. A particular illustrative embodiment then proceeds to block 206 and receives advertising data queue for normal speed playback of advertising data. An illustrative embodiment, and then proceeds to block 208 and receives advertising data queue for trick-play command data. An illustrative embodiment then proceeds to block 210 and senses the trick-play command at the end user device and increases or decreases the number of advertising data items in the advertising data queue. An illustrative embodiment then proceeds to block 212 and determines normal (unaltered by trick-play commands or duration extension discussed below) playback duration of advertising data during the trick-play command. An illustrative embodiment then proceeds to block 214 and fills the advertising data buffer with advertising data identified in the trick-play advertising data queue. The advertising data buffer is filled so that the advertising data play back requires the same amount of time as the advertising buffer time of normal advertising data playback. An illustrative embodiment then proceeds to terminal 216 and ends the flowchart of functions. In another embodiment, the advertising data buffer is filled so that the advertising data play back requires the same amount of time as the fast forwarding through the advertising buffer time during fast forward advertising data playback. In another embodiment, the advertising data buffer is filled so that the advertising data play back requires more time than fast forwarding through the advertising buffer time during fast forward advertising data playback. In another embodiment, the advertising data buffer is filled so that the advertising data play back requires more time than normal playback of the advertising buffer time during normal speed advertising data playback without a trick-play command being executed.

Figure 3:
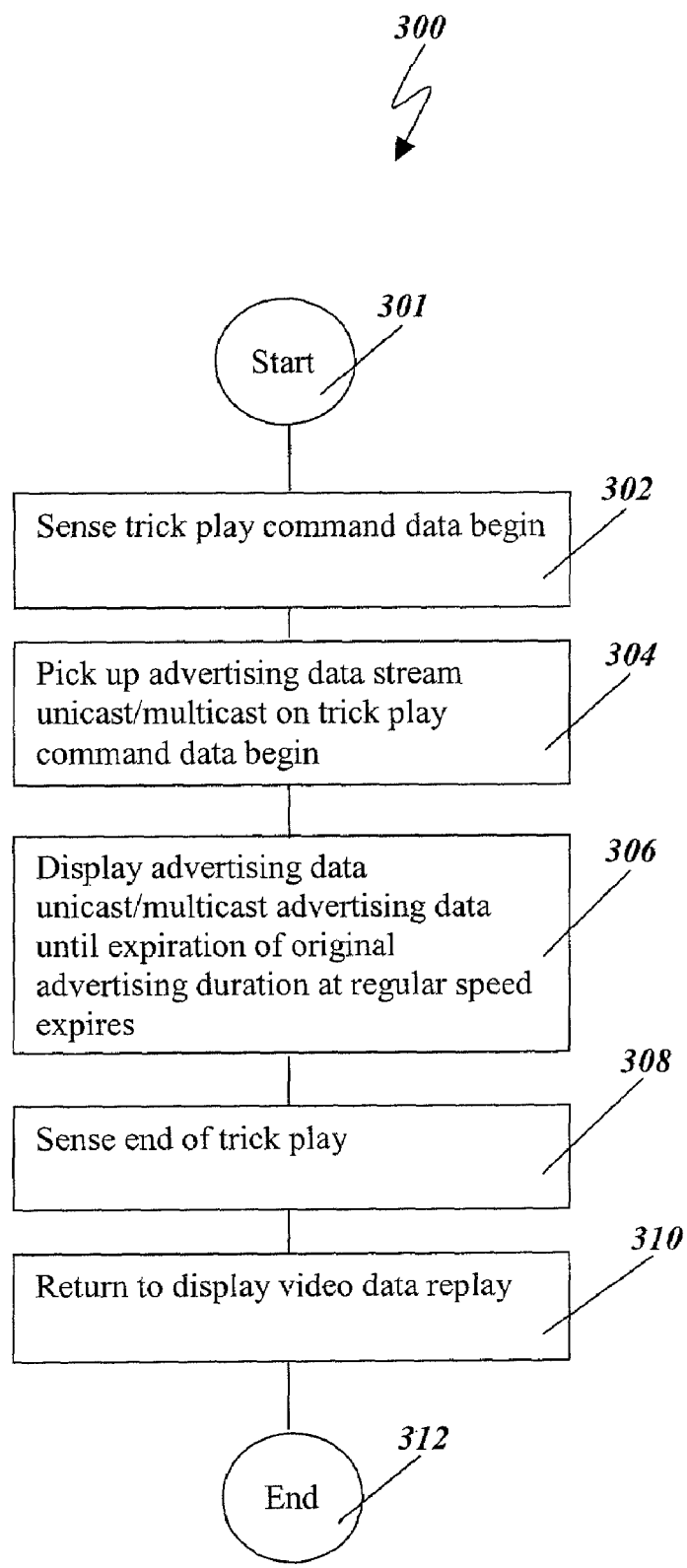
FIG. 3 depicts a flow chart of functions performed in another illustrative method for presenting advertising data.

Turning now to FIG. 3 a flowchart 300 illustrates functions executed in another particular illustrative embodiment. As shown in flowchart 300 a particular illustrative embodiment starts at terminal 301 and proceeds to block 302 where it senses the trick-play command data beginning. The particular alternative embodiment then proceeds to block 304 and selects an advertising data stream which is sent to the end user device from a communication network such as the IPTV system in a unicast or multicast data stream upon the beginning of the trick-play command data. An illustrative embodiment, then proceeds to block 306 where it displays the advertising data stream from the unicast or multicast until the expiration of the original advertising display duration at regular speed. At block 308, an illustrative embodiment senses the end of the trick-play command and proceeds to block 310 and returns to display the video data replay at the end user device.

Figure 4:
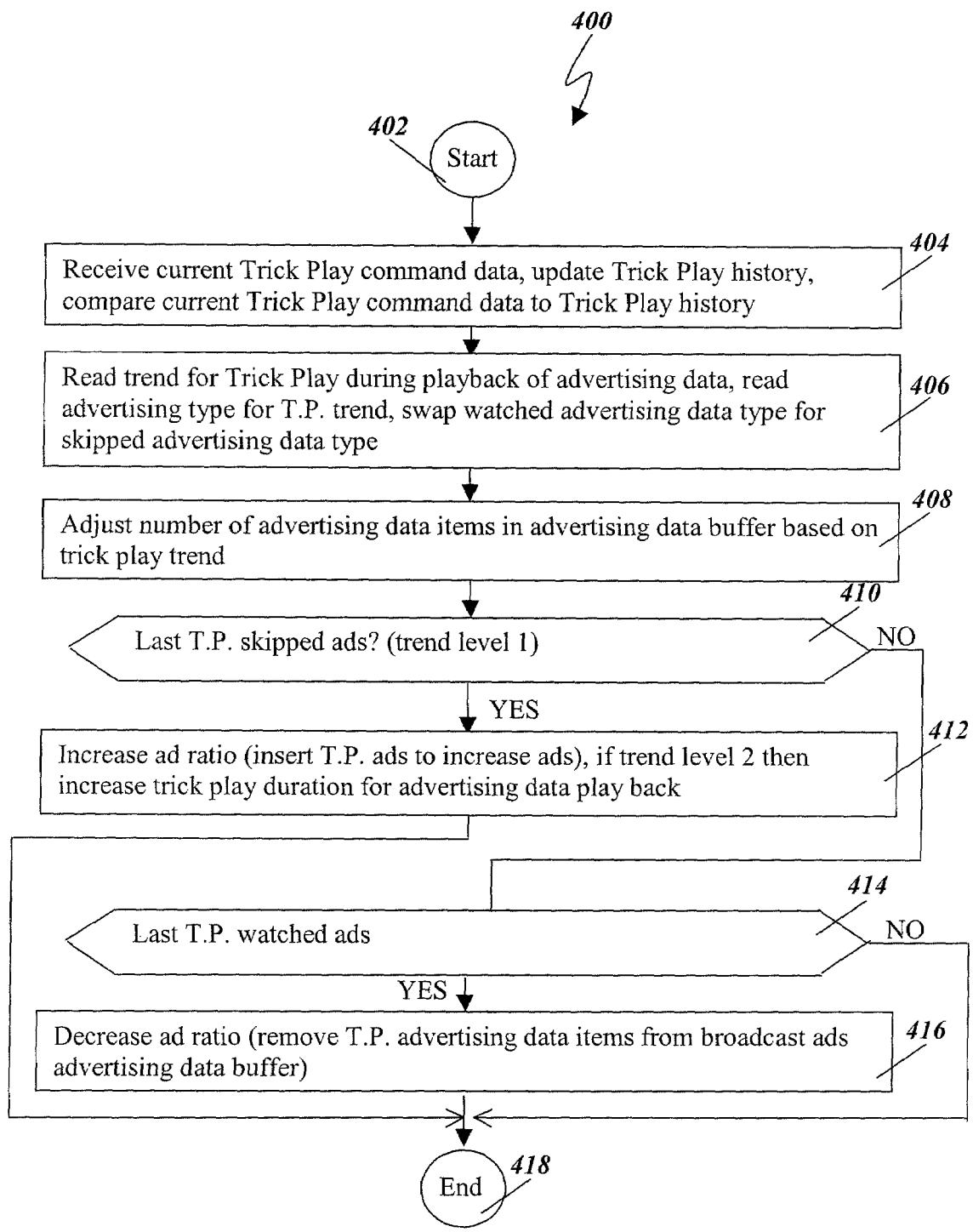
FIG. 4 depicts a flow chart of functions performed in another illustrative method for presenting advertising data.

Turning now to FIG. 4 a flowchart of functions executed in a particular illustrative embodiment is illustrated. The flowchart begins at terminal 402 were the execution functions starts and proceeds to block 404 where a particular illustrative embodiment receives a current trick-play command data and updates the trick-play command data history. A particular illustrative embodiment compares the current received trick-play command data to trick-play command data history stored in a data structure in the data base as described herein. An illustrative embodiment then proceeds to block 404 where it determines a trend for the trick-play commands. A particular illustrative embodiment determines the trick-play trend by comparing past trick-play commands data in the trick-play history stored in the data base, to the current trick-play command data and determines a trick-play trend, that is, whether or not an end user associated with an end user device is skipping advertising data, skipping video data or watching advertising data and/or watching video data displayed at the end user device. The current and most recent prior trick-play command data are stored in the trick-play command history and used to determine a trick-play trend and determine watched and skipped advertising data item types for each end user. The trend data is used to increase or decrease adverting data items presented to an end user. The watched and skipped advertising data items are used to replace advertising data items for particular end users based on their history of watching and skipping advertising data types.

Another illustrative embodiment also determines the type of advertising data an end user is skipping and watching by analyzing the trick-play data and advertising characterization data for advertising data items skipped and watched. At block 406 an illustrative embodiment reads the trend for the trick-play command during playback of the advertising data and reads the advertising data types for the trick-play command trend to determine what the advertising data type for advertising data that are being watched and the advertising data type of advertising data that are being skipped. An illustrative embodiment then proceeds to block 408 and adjusts the number of advertising data items in the advertising data buffer based on the trick-play command trend data. An illustrative embodiment then proceeds to decision block 410 and determines if the most recent prior trick-play command data skipped advertising data during playback.

If advertising data were skipped as determined in block 410, an illustrative embodiment proceeds to block 412 and increases the advertising data ratio. The advertising data ratio is increased by inserting additional advertising data into the advertising data buffer to increase the number of advertising data items placed in the advertising data buffer and played back during the trick-play command data execution duration or extended trick-play duration. An illustrative embodiment then proceeds from block 412 to end terminal 418. If the most recent prior trick-play command at decision block 410 not skip advertising data and no straight embodiment proceeds to block 414 and determines if the last trick-play command watched the advertising data items. If at block 414 the end user during last trick-play command watched some or all advertising data items, a particular illustrative embodiment proceeds to block 416 and decreases the advertising data item ratio that is removes trick-play advertising data items from the advertising data buffer at block 416. An illustrative embodiment then proceeds to block 418 and ends.

Figure 5:
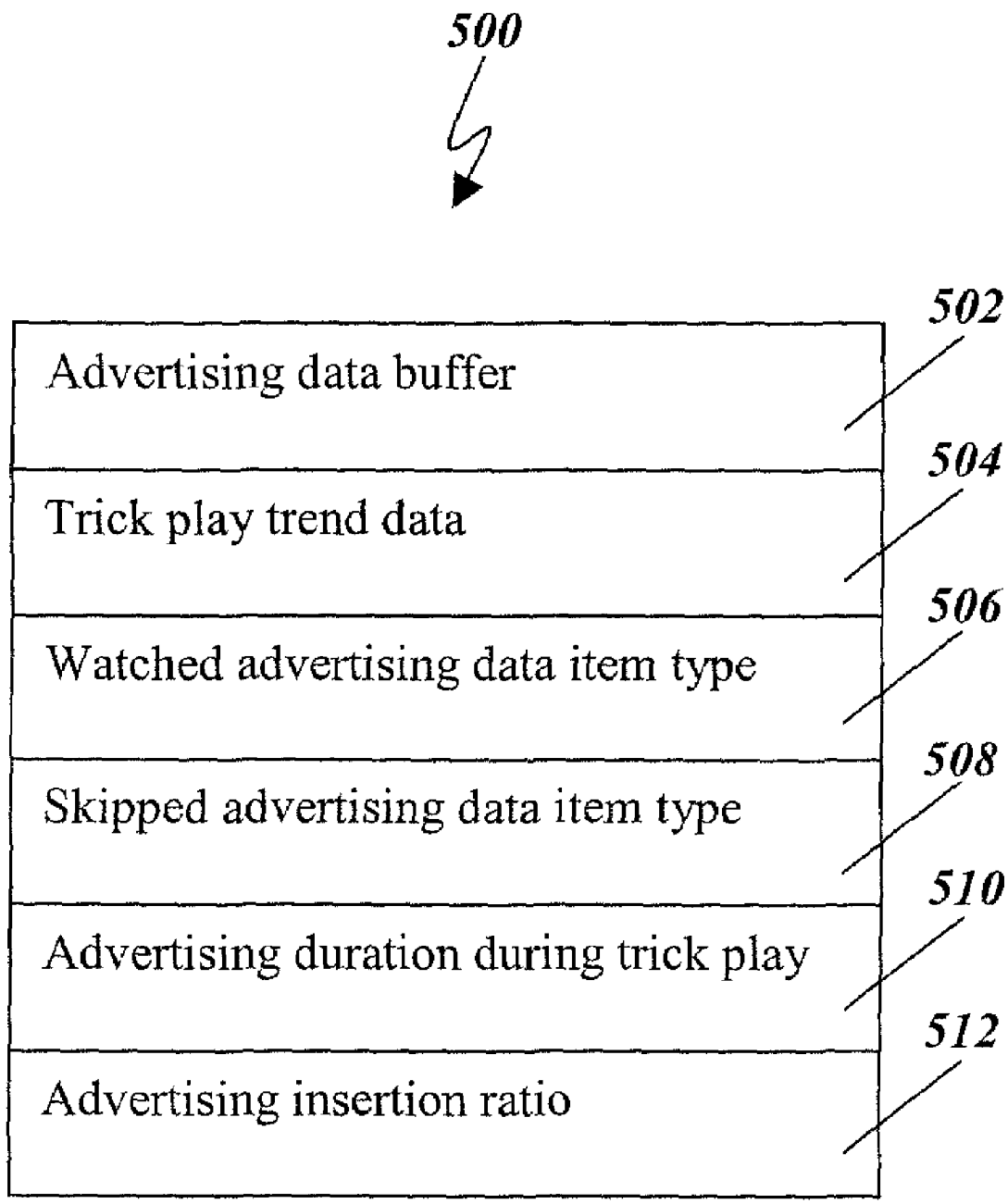
FIG. 5 depicts a data structure embedded in a computer readable medium that is used by a processor and method for presenting advertising data.

Turning now to FIG. 5 and a particular illustrative embodiment, a data structure 500 embedded in a computer readable medium is provided for use by the system and method. In a particular illustrative embodiment the data structure provides a first data structure field 502 for containing data indicative of the advertising data offer. The advertising data buffer contains advertising data items to be presented during trick-play at an end user device. The advertising data buffer data items can be obtained from the unicast or multicast are accessed in a database from the IPTV system based on the advertising data trick-play advertising data queue items sent to the end user device. The advertising data queue items identify advertising data items accessible in the IPTV advertising data base or the STB data base. In another embodiment, the data structure further includes but is not limited to a second data structure 504 field for containing data indicative of the trick-play trend data.

Another embodiment of the structure further comprises a third data structure field 506 for containing data indicative of the watched advertising data item types. The watch advertising data item types indicate the type of advertising data items that an end user is actually watching rather than skipping via trick-play commands. Advertising data item types can include but are not limited to sports, fashion, business, travel, leisure, culinary, automobiles, etc. Another embodiment further includes but is not limited to a fourth data structure field 508 for containing data indicative of the skipped advertising data item types. The skipped advertising data types are those types of advertising data items, which are skipped by a particular end user. Data structure field 510 is provided for containing advertising duration data. The advertising duration data indicates the length of playback for the advertising data and a particular broadcast video data stream, when not subjected to trick-play command data execution and presented for playback at a normal rate as presented during video data playback.

A particular alternate embodiment further includes a sixth data structure field 512 for containing an advertising data item insertion ratio. The advertising data in item insertion ratio is a factor for increasing advertising data items in the advertising data buffer 130. If any particular trick-play command is playing back advertising data at a four to one ratio (i.e., 4×) then the advertising data insertion ratio would be four to one (4×) as well to compensate for the faster video data playback by placing additional data into the advertising data buffer. Thus if a user were subjected to a single advertising data item at normal speed the user would be subjected to 4 advertising data items during a trick-play commands fast forwarding through the advertising data at a four times (4×) playback speed. In a particular embodiment, at trend level 1 (when the end user has skipped some advertising data items during the current trick-play command) the advertising data is increased during trick-play to occupy the same amount of time as the advertising data play back at normal speed. In another embodiment, at trend level 2 (when the end user has skipped some advertising data items during the current and most recent prior trick-play command) the advertising data is increased during trick-play to occupy a longer amount of time as the advertising data play back at normal speed.

Figure 6:
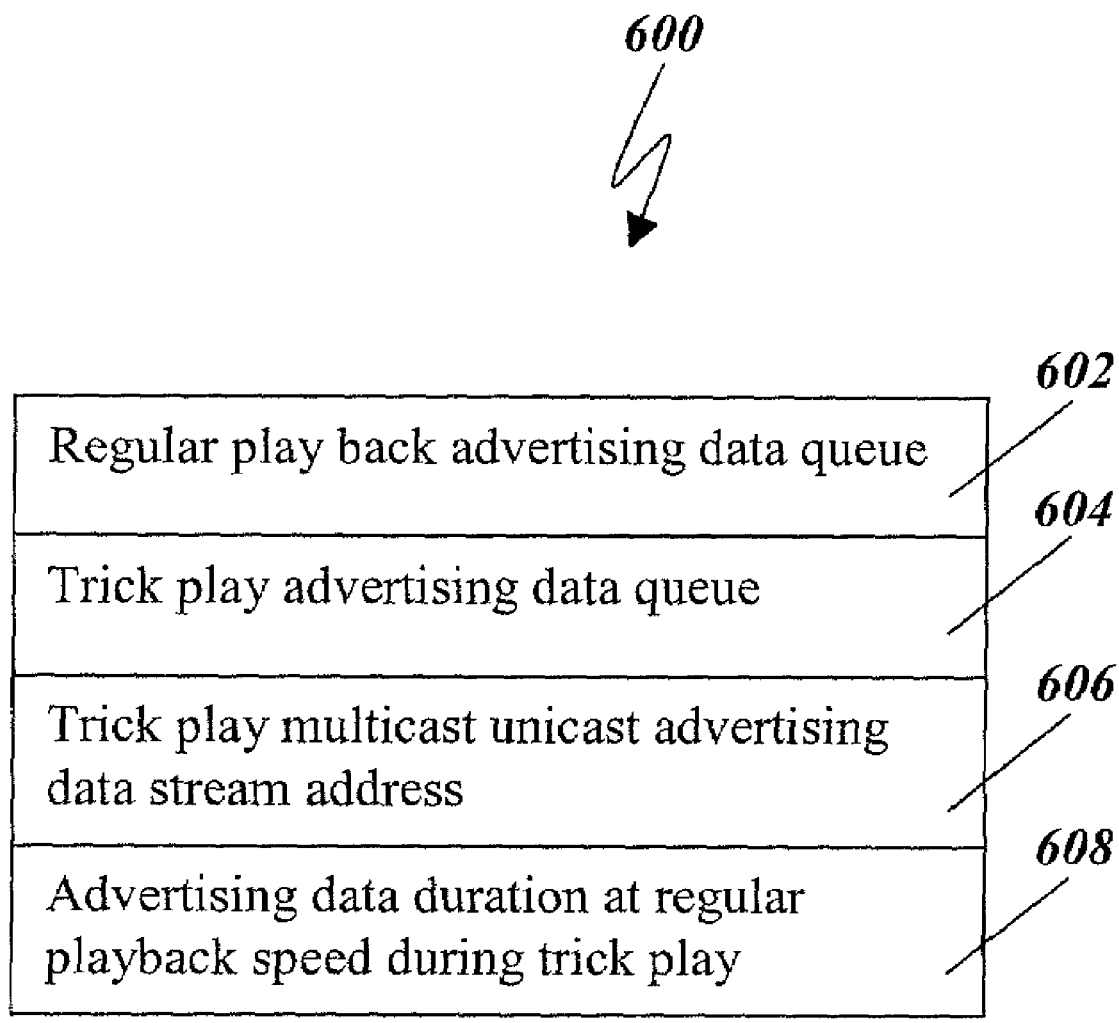
FIG. 6 depicts a data structure embedded in a computer readable medium that is used by a processor and method for presenting advertising data.

Turning now to FIG. 6, in another potential illustrative embodiment, a data structure is provided in a computer readable medium containing data used by an illustrative method and system. The data structure 600 includes but is not limit to a first data structure field 602 for containing data indicative of a regular playback and advertising data key. The regular playback and advertising data queue includes advertising data identifiers for playback during normal playback in the absence of trick-play. In another embodiment of the advertising data further includes a second data structure field 604 for containing data indicative of a trick-play advertising data queue.

The trick-play advertising data queue includes but is not limited to advertising data item identifiers for filling the advertising data queue buffer and presenting for playback during trick-play at ending user device. The particular advertising data structure further includes but is not limited to a third data structure field 606 for containing data indicative of a trick-play multicast or unicast advertising data stream address. The trick-play advertising data stream addresses are used to stream data into an advertising data buffer for playback during a trick-play command or during a extended trick-play execution duration as adjusted by a particular illustrative environment. A particular illustrative data structure further includes a fourth data structure field 608 for containing data indicative of advertising data duration at regular playback speed, that is, without trick-play commands adjusting playback of video and advertising data. The advertising data direction at regular playback speed rate indicates the duration of the advertising data in the broadcast data stream which would be played back at normal speed without a trick-play command being invoked during playback.

Figure 7:
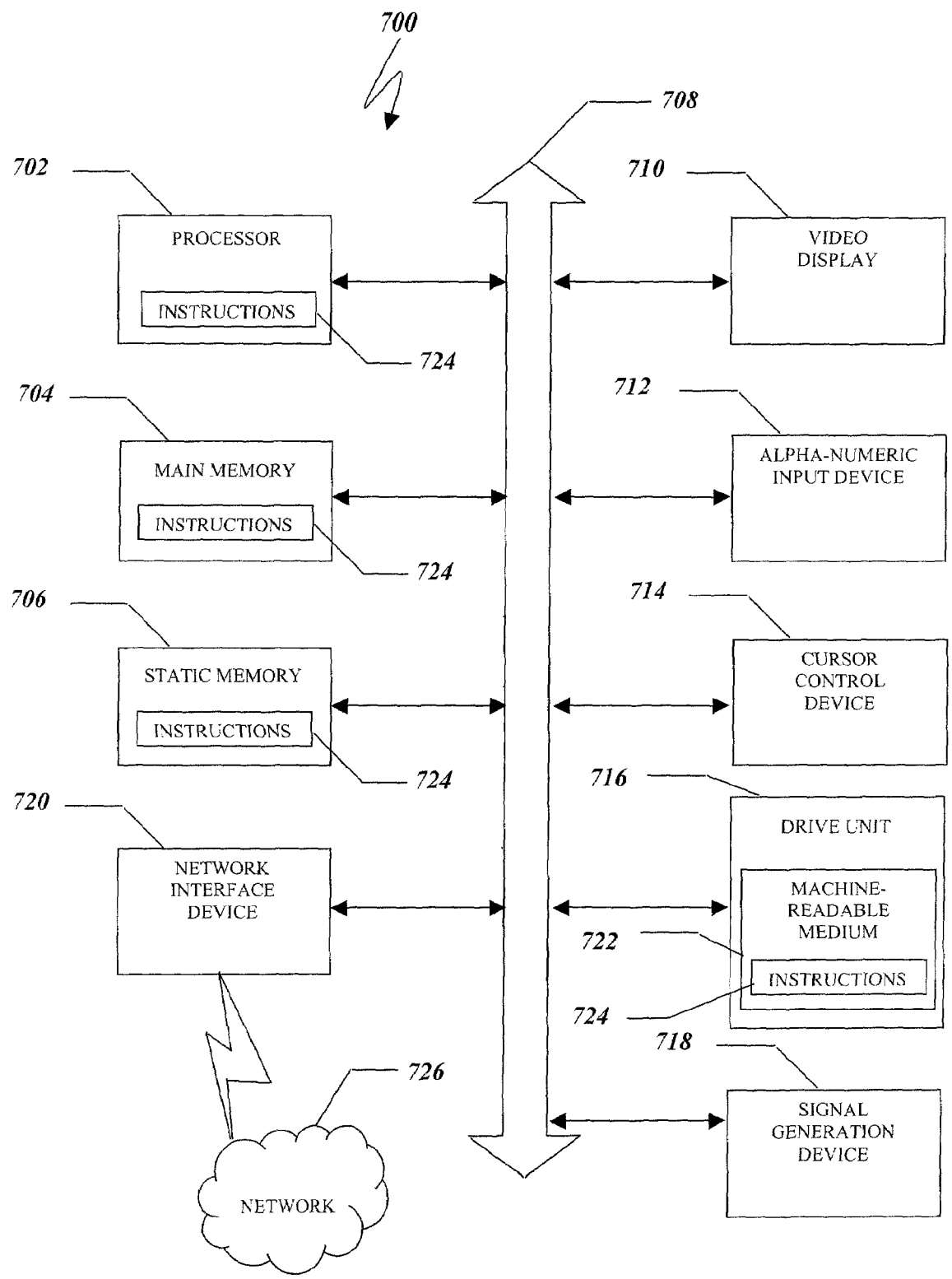
FIG. 7 is an illustrative embodiment of a machine for presenting functions disclosed in an illustrative embodiment.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., liquid crystals display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720. The machine readable medium may also contain a data structure for containing data useful in providing a functional relationship between the data and a machine or computer in an illustrative embodiment of the disclosed system and method.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable medium, containing a computer program comprising computer executable instructions that when executed by a computer for present advertising data, the computer program comprising:
    instructions to sense current trick-play command data at an end user device;
    instructions to compare the current trick play command to a trick play command history to determine a trick-play trend;
    instructions to update trick-play trend data for the end user device based on the trick play trend;
    instructions to display advertising data on the end user device for a duration longer than a duration of normal playback of advertising data at normal speed that is being skipped during the current trick play command and continuing the display of the advertising data until after the duration of normal playback of the when the trick play trend data indicates that an end user at the end user device has skipped advertising data during the last two consecutive trick play commands including the current trick play command and during a most recent trick play command in the trick play command history; and
    instructions to display advertising data on the end user device for a duration that is equal to normal playback of advertising data at normal speed that is being skipped during the current trick play command and continuing the display of the advertising data until the duration of normal playback of the when the trick play trend data indicates that an end user at the end user device has skipped advertising data during in only one of the last two consecutive trick play commands including the current trick play command and during a most recent trick play command in the trick play command history.

2. The medium of claim 1, further comprising:
    instructions to substitute in the advertising data buffer an advertising data item having a watched advertising data item type for an advertising data item having a skipped advertising data item type.

3. The medium of claim 1, wherein adjusting further comprises:
    placing additional advertising data items in the advertising data buffer when the trick-play trend data indicates that a most recent prior trick-play command data skipped an advertising data item in the advertising data buffer; and
    removing advertising data items from the advertising data buffer when the trick-play trend data indicates that the most recent prior trick-play command data did not skip an advertising data item in the advertising data buffer.

4. The medium of claim 3, wherein placing further comprises placing an additional number of advertising data items in the advertising data buffer in proportion to an amount of data skipped in the advertising data buffer by the current trick-play command data.

5. The medium of claim 4, wherein placing further comprises:
    extending a trick-play execution duration for the current trick-play command data based on the trick-play trend data; and
    presenting at the end user device, the advertising data items in the advertising data buffer for the extended trick-play execution duration.

6. The medium of claim 5, further comprising:
    receiving a trick-play advertising data queue at the end user device from an internet protocol television (IPTV) system identifying the advertising data items presented.

7. The medium of claim 4, wherein placing further comprises:
    receiving from an IPTV system at the end user device a unicast of the additional advertising data items based on an end user profile for an end user associated with the end user device.

8. A system for presenting advertising data, the system comprising:
    a processor in data communication with advertising data items at an end user device;
    a buffer for containing the advertising data items at the end user device; and
    a computer program comprising instructions embedded in a computer readable memory,
    the computer program further comprising:
    instructions to sense current trick-play command data at an end user device;
    instructions to update trick-play trend data for the end user device based on the current trick-play command data and instructions to adjust a number of advertising data items in an advertising data buffer presented at the end user device based on the trick-play trend data; and
    instructions to display advertising data on the end user device for a duration longer than a duration of normal playback of advertising data at normal speed that is being skipped during the current trick play command and continuing the display of the advertising data until after the duration of normal playback of the when the trick play trend data indicates that an end user at the end user device has skipped advertising data during the last two consecutive trick play commands including the current trick play command and during a most recent trick play command in the trick play command history; and instructions to display advertising data on the end user device for a duration that is equal to normal playback of advertising data at normal speed that is being skipped during the current trick play command and continuing the display of the advertising data until the duration of normal playback of the when the trick play trend data indicates that an end user at the end user device has skipped advertising data during in only one of the last two consecutive trick play commands including the current trick play command and during a most recent trick play command in the trick play command history.

9. The system of claim 8, the computer program further comprising instructions to substitute in the advertising data buffer an advertising data item having a watched advertising data item type for an advertising data item having a skipped advertising data item type.

10. The system of claim 8, wherein the instructions to adjust further comprise instructions to place additional advertising data items in the advertising data buffer when the trick-play trend data indicates that a most recent prior trick-play command data skipped an advertising data item in the advertising data buffer and instructions to remove advertising data items from the advertising data buffer when the trick-play trend data indicates that the most recent prior trick-play command data did not skip an advertising data item in the advertising data buffer.

11. The system of claim 10, wherein the instructions to place further comprise instructions to place an additional number of advertising data items in the advertising data buffer in proportion to an amount of data skipped in the advertising data buffer by the current trick-play command data.

12. The system of claim 11, wherein the instructions to place further comprises
  instructions to extend a trick-play execution duration for the current trick-play command data based on the trick-play trend data and instructions to present at the end user device, the advertising data items in the advertising data buffer for the extended trick-play execution duration.

13. The system of claim 12, the computer program further comprising instructions to receive a trick-play advertising data queue at the end user device from an internet protocol television system identifying the advertising data items presented.

14. The system of claim 11, wherein the instructions to place further comprise instructions to receive from an internet protocol television system at the end user device a unicast of the additional advertising data items based on an end user profile for an end user associated with the end user device.

15. A data structure embedded a non-transitory computer readable medium, the data structure comprising:
  a first field for containing data indicative of trick-play trend data indicating if an end user has skipped advertising data in current and most recent trick play commands based on most recent prior trick-play command data for displaying advertising data on the end user device for a duration longer than a duration of normal playback at normal speed of the advertising data that is skipped during the current trick play command when the trick play trend data indicates that an end user at the end user device has skipped advertising data during the current trick play command and during a most recent trick play command in the trick play command history.

16. The data structure of claim 15, further comprising:
  a second field for containing data indicative of a watched advertising data item type for replacing a skipped advertising data item type in an advertising data buffer based on the trick-play trend data.

17. The data structure of claim 16, further comprising:
  a third field for containing data indicative of an advertising insertion ratio for placing an additional number of advertising data items in the advertising data buffer.

18. The data structure of claim 17, further comprising:
  a fourth field for containing data indicative of an extended trick-play advertising duration for presenting the advertising data items in the advertising data buffer for the extended trick-play advertising duration.

* * * * *